358-86. OR 2,854,506 SR
SEARCH ROOM
Sept. 30, 1958 S. B. PICKLES 2,854,506
TELEVISION SIGNAL DISTRIBUTION SYSTEM
Filed June 15, 1955
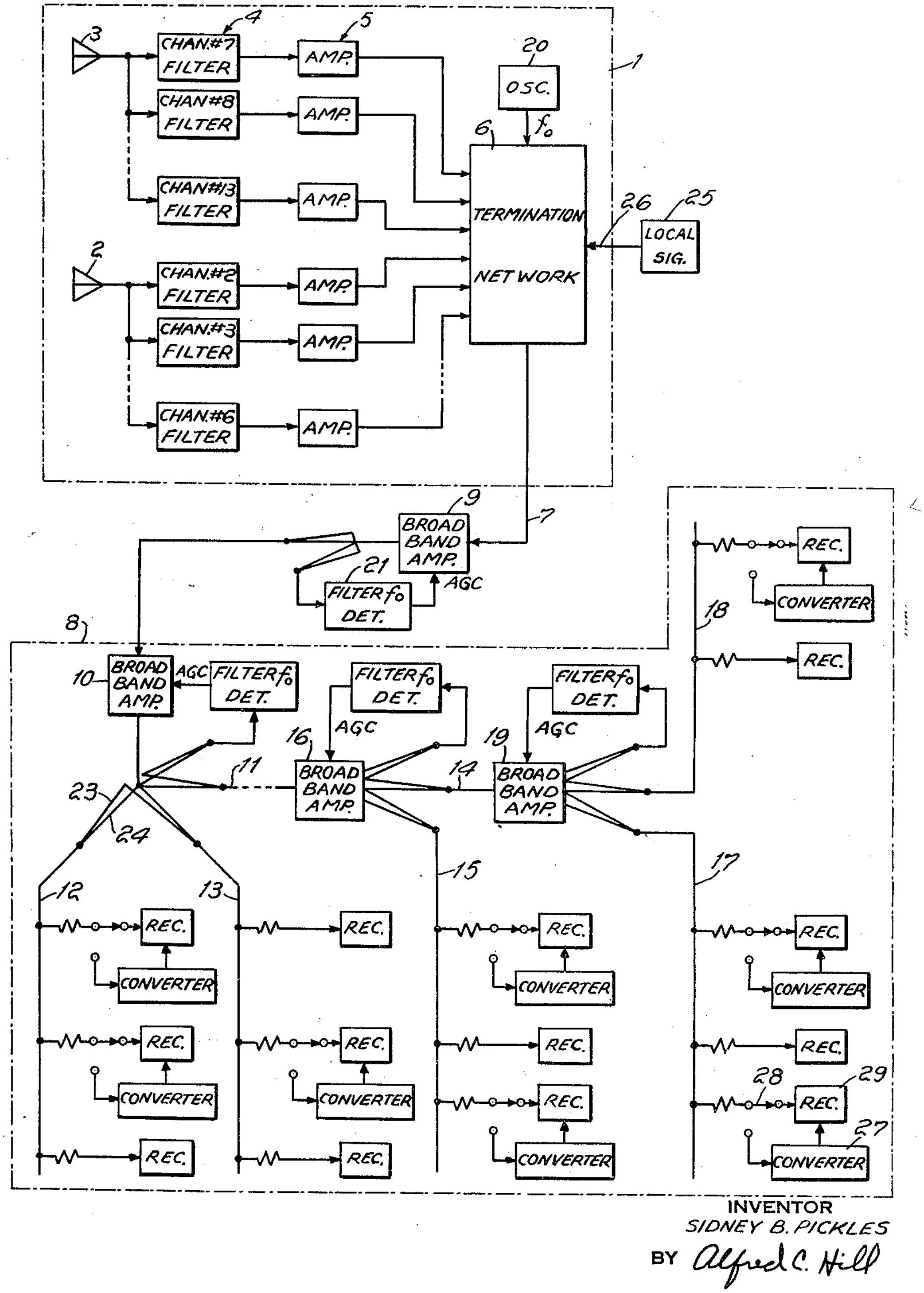
T500 Rw
INVENTOR
SIDNEY B. PICKLES
BY Alfred C. Hill
AGENT United States Patent Office 2,854,506

Patented Sept. 30, 1958

2,854,506

TELEVISION SIGNAL DISTRIBUTION SYSTEM

Sidney B. Pickles, Monterey, Calif., assignor to International Telephone and Telegraph Corporation, Nutley, N. J., a corporation of Maryland Application June 15, 1955, Serial No. 515,711

1 Claim. (Cl. 178—6)

This invention relates to television systems and more particularly to a television system to expand television signal coverage to those population areas disposed beyond the fringe limit of or shielded from radiated television signals.

There are numerous localities in this country that are either beyond the fringe area of network television signals or are shielded from these television signals by the terrain surrounding the population area. As a consequence it is impossible for these population areas to receive, in a normal manner, the network television programs. To expand television signal coverage into these population areas, it has been proposed to employ community television antenna and distribution systems. These systems include antennas located on tops of hills or tall masts in regions somewhat remote from the population area to be served. A plurality of antennas would be disposed to capture the television signals of the desired television channels. These signals would then be amplified and applied in appropiate manner through appropriate attenuation networks to the main transmission lines. The captured signals would be transmitted along the transmission line from the antenna site to the population area to be served. Upon entrance into the population area, the transmission line would be branched into secondary and branch transmission lines to serve the various portions of this population area. Throughout the main transmission line and certain of the signal paths or secondary transmission lines, it will be necessary to restore the level of the signals by means of appropriate wide band amplifiers to overcome the attenuation of the transmission lines. The transmission line losses vary as a function of temperature and thus the gain of the broadband amplifiers cannot be set at a constant gain value to return the transmitted signal to a given level. Thus, there is employed a means to adjust the gain of the amplifier to compensate for the variation of attenuation in the transmission line.

It has been the practice in past community television systems to employ a signal of a particular television channel or the sum of channel signals as a reference against which the gain of the broadband amplifiers may be adjusted. This basis of automatic gain control (AGC) is not fool proof since the signals on the television channels are not always present and thus the reference signal itself is not constant. Furthermore, the problem of impedance matching is of importance in the television signal distribution system since the main transmission line and the secondary transmission lines must be branched to provide as complete a signal coverage as possible within the community. It has been the practice in the past to employ combinations of quarter-wave sections of transmission lines to accomplish the required impedance matching between the main transmission line or secondary transmission lines and the various branch transmission lines.

There has been a demand for the transmission of local signals in community television systems. These signals may be either of the free or the toll type. Numerous subscription type television systems have been proposed and the main feature of these systems has been the utilization of a coded signal separate from the television signal being transmitted which will enable those persons subscribing to this television service to unscramble the television signal transmitted for consumer consumption.

It is an object of this invention to provide an improved community television system for transmission of television signals, local and/or remote, to a population area removed from the reception of the effective signal transmitted by television signal transmitters.

Another object of this invention is to provide a community television system having a novel AGC arrangement for the broadband amplifiers therein, an improved impedance matching arrangement at the junction point of the various branches of the distribution system and an improved means of transmitting local signals through the community television distribution system either as a free service or a toll service.

A feature of this invention is the provision of an AGC arrangement which includes the transmission of a reference signal in the television signal distribution system having a particular frequency and a constant amplitude output. Coupled to the output of each broadband amplifier there is provided a filter and amplitude detector to select the given signal and detect the amplitude of this signal to provide a reference amplitude level for the signals being transmitted through the broadband amplifier. An AGC control signal is produced in accordance with the variation of the amplitude of the reference signal from the reference amplitude level to control the gain of the broadband amplifier and thereby provide a constant output therefrom regardless of variations in transmission line loss and the number of television channels or other signals transmitted over the distribution system.

Another feature of this invention is the provision of an impedance matching means at the plurality of junction point into which the broadband amplifier couples its output signal. The impedance matching means will provide a matched impedance at the output of the broadband amplifier regardless of the number of branches of the distribution system by employing an aperiodic transformers. These transformers enable the system to be kept completely broadband and does not tie the frequency transmitting ability of the system to any bands or regions within the broadband capabilities of the amplifiers in use.

Still another feature of this invention is the provision of the transmission of local signals through the community television distribution system from the antenna site to subscribers on the distribution system. The local signal is transmitted on a frequency between the high and low television frequency spectrum allocations which the standard television receiver cannot pick up. At the receivers there is provided a converter which will heterodyne the signals in a particular television channel to a lower unreceivable frequency and then heterodyne the local signal for substitution into the vacant channel of the standard television receiver. The subscriber may obtain the local television signal by manually operating the converter, or if a toll is charged, the converter may be operated by inserting the necessary fee in a coin box which will make the converter operative.

The above-mentioned and other features and objects of this invention will become more apparent by reference to the following description taken in conjunction with the accompaning drawing, in which the sole figure illustrates a schematic diagram in block form of the community television system of this invention.

The figure of this invention illustrates the community television system as including an antenna site 1 which may be located on the top of a hill or a tall mast in a region accessible to the desired remote television signals. When several television channels are available several programs may have to be transmitted simultaneously over the distribution system. One method of capturing or picking up these television signals is to use antenna 2 of sufficient bandwidth to cover the lower television spectrum, namely 54 to 88 mc., and antenna 3 to cover the higher television spectrum of 174 to 216 mc. The outputs of antennas 2 and 3 are fed into a group of filters 4 which present surge impedance terminations at the pass frequency and many times higher impedance at all other frequencies. Filters 4 and 5 segregate the received signals into the proper television channel allocation. The signals applied to amplifiers 5 are all of varying level. Therefore they have to be amplified in separate amplifiers with individual AVC circuits to bring the outputs of each of the amplifiers up to a common amplitude level.

In order to prevent the outputs of amplifiers 5 from interloading, or interacting the signals are fed into termination or discrimination network 6 to assure that the amplifiers 5 feed only into the main transmission line 7 and sees an infinite impedance when looking into any of the other amplifiers. The output of termination network 6 contains all of the signals that are being picked up by antennas 2 and 3. The received or captured signals are transmitted from antenna site 1 via transmission line 7 to the community or population area 8 for strategic distribution throughout this population area by means of secondary and branch transmission lines.

The multi-channel signals coupled over transmission line 7 are amplified by broadband types of amplifiers known as distributed amplifiers to restore the level of the signals on these lines since there is appreciable attenuation therein for the required lengths of line. In certain instances, it may be necessary to employ in main transmission line 7 broadband amplifier 9 to raise the signal levels to a given level to overcome the attenuation present in the main transmission line. When the multi-signals on transmission line 7 are received in population area 8, it may be necessary to amplify the signals again in broadband amplifier 10 prior to branching the signals through secondary transmission line 11 and branch lines 12 and 13. The signals on branch lines 12 and 13 are utilized to distribute the multi-signals to the subscribers disposed adjacent to the branch lines. The multi-signals on secondary transmission line 11 is transmitted to another junction point and coupled to secondary transmission line 14 and branch line 15 for appropriate distribution of signals to the adjacent portion of the population area and a distant portion thereof. Prior to reaching this junction point the multi-signals, it may be necessary to employ another broadband amplifier 16 to raise the signal level to compensate for the attenuation of the transmission lines. The signals on secondary transmission line 14 is transmitted to still other portions of the population area for local distribution therein as illustrated by branch lines 17 and 18 and includes prior to the junction point a broadband amplifier 19.

The broadband amplifiers are employed to overcome the attenuation of the transmission lines. Since the transmission line losses vary as a function of temperature, a single value of gain for the broadband amplifiers will not maintain a constant signal level output therefrom. Therefore, gain control is required to provide a constant level output from the broadband amplifiers to assure that the subscribers on the branch line are fed at a constant signal level regardless of whether one or all channels are being provided.

Automatic gain control is accomplished in the community television system of this invention by employing an oscillator 20 to feed a signal of relatively narrow bandwidth having a given frequency and constant amplitude level into network 6 for transmission in the distribution system. The output of each broadband amplifier is coupled to a filter and detector unit as illustrated by unit 21 in association with broadband amplifier 9. The filter of unit 21 has a sharp filtering characteristic and will pick up the given frequency of oscillator 20 for application to the detector of unit 21. The detector will be set at a given reference level as determined by the amplitude level of oscillator 20 and the normal attenuation of the transmission lines. An attenuation variation of the signal output of oscillator 20 will be detected by unit 21 and will supply a control voltage to the broadband amplifier to correct the gain thereof to keep the output constant regardless of variations in the transmission line loss and regardless of variations in the transmission line loss and regardless of the number television channels or other signals which may be transmitted over the system.

Preferably a broadband amplifier, such as amplifier 10, is located just before the main transmission line is branched to distribute the multi-signals to subscribers disposed in certain portions of the population area. This is done to assure that the output signals are distributed to the subscribers at a constant amplitude level. It is important that the output of the broadband amplifier 10 and the other amplifiers of this system be kept at a proper impedance regardless of the number of divisions of the output signal. By proper impedance is meant an impedance match between the output of amplifier 10 and each of the secondary branch transmission lines. It has been found that the use of aperiodic transformers 22 will keep the resultant impedance at the junction point constant. An aperiodic transformer may be described briefly as including two transmission lines, such as lines 23 and 24, each having tapered characteristics and disposed with respect to each other so that they mutually interact in a tapered manner. A more detailed disclosure and impedance matching characteristics of aperiodic transformers may be had by a reference to U. S. Patent No. 2,165,087 issued to Andrew Alford. The aperiodic transformers have to be designed for the number of divisions required. For instance, if there are four divisions of the output of broadband amplifier 10, and the surge impedances of the branching lines are 70 ohms and the impedance at the output of amplifier 10 is 70 ohms, the aperiodic transformers would have to transform the impedance of the four lines being fed from 70 ohms to 280 ohms, such that their parallel impedance would be returned to 70 ohms to properly match the output of the broadband amplifier 10. While there are other ways and means of matching impedances by means of combinations of quarterwave sections of transmission lines and so forth the aperiodic transformer is the only means which allows the distribution system to be kept completely broadband and does not tie the frequency transmitting ability of the distribution system to any bands or regions within the broadband capabilities of the broadband amplifiers employed in the distribution system of this invention. It is proposed that each junction point along the distribution line where it is necessary to branch the energy of the multi-signals, the aperiodic transformers will be employed to provide the proper impedance match between the output of the broadband amplifiers, or the main and secondary transmission lines, and the branch lines required for the distribution of the multi-signals to the subscribers in a particular portion of the population area.

There may be certain situations where it will be desirable to transmit locally generated television signals on the community television system of this invention. This can be accomplished by coupling the signal of a local television signal source, as depicted in block 25, into the main transmission line. Source 25 a local television studio originating live or motion picture shows supplies the television signals at a frequency disposed between the high and low television spectrums through conductor 26 to the network 6 at antenna site 1.

With the local television signals being transmitted from source 25 at a frequency intermediate the low and high television spectrums, it is impossible for the standard television receiver to pick up and utilize this signal for observation purposes.

The subscribers of the community television system will be provided with a converter unit, such as is indicated at 27, which will heterodyne the signal in a particular television channel to a lower unreceivable frequency and will heterodyne the local television signal to occupy the vacated channel. Thus, the local television signal is substituted for a normal channel signal through the action of the converter and then the standard television receiver can function normally for presentation of the local television signal. Where there is no charge for receiving the local signal, the subscriber may view the local signal by manually operating switch 28 to place converter 27 into operation. However, if there is a toll for receiving the local signal then switch 28 may be activated only in conjunction with a coin box. When the necessary fee is inserted in the coin box switch 28 will be operated to place the converter 27 in an operative relationship with receiver 29.

While I have described above the principles of my invention in connection with specific apparatus, it is to be clearly understood that this description is made only by a way of example and not as a limitation to the scope of my invention as set forth in the objects thereof and in the accompanying claim.

I claim:

A television signal receiving system comprising an arrangement to receive a plurality of conventional intelligible television signals originating at a remote location certain ones of which are in the high frequency television allocation and certain others of which are in the low frequency television allocation, a source of local conventional intelligible television signal originating in the vicinity of said receiving arrangement, said local television signal having a carrier frequency disposed intermediate said low frequency allocation and said high frequency allocation, a plurality of television receivers normally responsive to only those television signals in said high frequency allocation and said low frequency allocation, means to couple the television signals from said receiving arrangement and from said local source to each of said receivers, a frequency converter means coupled to said receivers and selective means coupled to said receivers to couple all of said television signals to said converter, said converter means including means to remove a selected one of the signals from said receiving arrangement from its normal frequency allocation and means to translate said local television signal into the frequency allocation of said selected one of the signals from said receiving arrangement for utilization in the usual circuits of said receivers.

References Cited in the file of this patent

UNITED STATES PATENTS

| | | |
|---|---|---|
| 2,293,750 | Leibe | Aug. 25, 1942 |
| 2,523,173 | Winters | Sept. 16, 1950 |
| 2,731,620 | Gottfried | Jan. 17, 1956 |
| 2,753,393 | Pawley | July 3, 1956 |

FOREIGN PATENTS

| | | |
|---|---|---|
| 150,155 | Australia | May 4, 1950 |

OTHER REFERENCES

Community TV Systems, Radio-Electronic, August 1953, pages 40–43.

Radio and Television News, March 1951, pages 31, 33 and 34.